United States Patent [19]
Goldfarb et al.

[11] Patent Number: 5,865,677
[45] Date of Patent: Feb. 2, 1999

[54] HAND-HELD ELECTRONIC GAME

[75] Inventors: Martin Ion Goldfarb, Santa Monica; Adolph Eddy Goldfarb, Westlake Village, both of Calif.

[73] Assignee: Tiger Electronics, Ltd., Pawtucket, R.I.

[21] Appl. No.: 775,368

[22] Filed: Jan. 3, 1997

[51] Int. Cl.⁶ .................................................. G09B 7/06
[52] U.S. Cl. ................................ 463/9; 463/46; 434/327
[58] Field of Search ................................. 463/9, 46, 47, 463/36, 37; 434/317, 327, 335, 322

[56] References Cited

U.S. PATENT DOCUMENTS

| | | | |
|---|---|---|---|
| 4,164,078 | 8/1979 | Goldfarb | 35/9 B |
| 4,303,398 | 12/1981 | Yoseloff | 434/335 |
| 4,308,017 | 12/1981 | Laughon et al. | 434/169 |
| 4,355,984 | 10/1982 | Slavik et al. | 434/335 |
| 4,498,870 | 2/1985 | Madonna | 434/335 |
| 4,997,374 | 3/1991 | Simone | 434/317 |
| 5,122,062 | 6/1992 | Cutler et al. | 434/327 |
| 5,437,552 | 8/1995 | Baer et al. | 434/317 |
| 5,466,158 | 11/1995 | Smith, III | 434/317 |

FOREIGN PATENT DOCUMENTS

6-149146  5/1994  Japan.

*Primary Examiner*—Jessica J. Harrison
*Assistant Examiner*—James Schaaf
*Attorney, Agent, or Firm*—Fitch, Even, Tabin & Flannery

[57] ABSTRACT

A very compact and ergonomical hand-held electronic gaming device is provided having a body including a front housing portion for containing the game's electronic circuitry and to which input keys for the game are mounted, and a rear extension portion extending rearwardly from the front housing portion for securing of a printed game book thereto. The gaming device is designed so that playing the game takes place with the book opened by the player while still secured to the rear extension so that the game body and open book can be held with one hand while using the other free hand to key in input to the game based on printed matter read from the open book. Thus, the game book need not be separated from the game to play the game. Preferably, the game has multiple-choice questions with associated answer choices to be selected by the player. A NEXT key is provided so that the questions can be answered sequentially without having to key in each question number. The book is easy to open as the fold lines for the book sheets and cover are spaced slightly rearwardly of the extension rear edge. When the book is folded closed, the game is very compact as the book only projects slightly beyond the rear edge and otherwise is substantially contained with the housing dimensions.

26 Claims, 5 Drawing Sheets

HAND-HELD ELECTRONIC GAME

FIELD OF THE INVENTION

The invention relates to a hand-held electronic device and, more particularly, to a hand-held electronic game having a game book secured thereto.

BACKGROUND OF THE INVENTION

Hand-held electronic gaming devices are known which utilize input keys for entering input into the game in response to material read from a booklet—see U.S. Pat. No. 4,164,078 to Goldfarb one of the Applicants and U.S. Pat. No. 4,303,398 to Yoseloff. Applicants' wherein also developed a hand-held electronic game which is a predecessor to the game which is the subject of the present application and which utilizes a keyboard for entering input information based on questions provided in a game book.

In hand-held electronic games, compactness of design is typically an important consideration as the more bulky the game, the more difficult it can be to handle and play. This is particularly true where separate sheets of text or game books are also provided for use with the hand-held game. Applicants' prior game, includes a hinged cover for closing over the keypad when the game is not in use with the closed game book contained within the cover. When the game is to be used, the hinged cover is pivoted open and the game book is removed from the hinged cover and opened for being read by a player. The use of the hinged cover makes the above game device less compact than is desirable when the cover is pivoted open for playing of the game. In addition, having to take out and separate the game book from the game for playing of the game is undesirable in that the potential for losing the book is increased. Accordingly, there is a need for a hand-held electronic game utilizing a game book which has a compact, ergonomic design for ease in playing and avoids the potential problem of losing game books associated with the electronic game.

To play Applicants' prior game, the sheets of the game book included number coded questions with multiple letter coded answers, i.e., multiple-choice questions with associated answer choices, with the player entering the number code of the question and then choosing the letter code of the answer they feel correctly responds to the selected question. To go to another question after answering of a selected question, the player has to push a CLEAR key and then select and enter the code of another question. Typically, the question books contain hundreds of such questions so that entering their number codes requires punching multiple keys, in addition to the CLEAR key before entering the question number and the ENTER key after. The procedure of having to press a CLEAR button and then punch in the number code on the keys for each question, and then press the ENTER key, can become quite tedious and burdensome, particularly if the player is going through a substantial number of questions in the book. Accordingly, there is a need for a game which does not require the user to each time a question is being selected to press in the code for that question.

SUMMARY OF THE INVENTION

In accordance with the present invention, an electronic hand-held game is provided having a very compact, ergonomic design with an attached booklet which can be opened for playing of the game without having to remove the booklet from the game. The hand-held game is particular well suited for use by children, such as during long car trips, as the game can be easily played without having to put the game down on a support surface or paging through the pages of a separate book or having to deal with a hinge cover which can make holding the game an awkward proposition, particularly over long durations.

In one form, a hand-held electronic device is provided including a hand-held housing having predetermined dimensions. A printed booklet is provided having folded first and second pages joined by a fold line to be folded to a closed position to be supported by the housing and to be substantially contained within the predetermined dimension of the housing when in the closed position. At least one of the second pages is to open into an open position, extending substantially outwardly of the housing dimensions while the device is in use. The first and second pages include printed matter for prompting a user to select an input in response to the printed matter. Electronic circuitry is provided mounted in the housing for performing logic operations in response to the selected input from the user and for generating a display signal. Input structure is mounted on the housing and connected to the electronic circuitry for the user to enter the selected input. A display is mounted on the housing for providing a visual stimulus to the user in response to the selected input and also providing the display signal generated by the electronic circuitry. The hand-held game herein is of particularly compact design as the booklet is designed to be pivoted open beyond the dimensions of the game housing so that the game body or housing itself need not be as large so as to encompass the entire open book.

The book can either be removable secured to the housing for removal therefrom or permanently secured to the housing against removal therefrom. As previously mentioned, the arrangement of the booklet secured to the housing and capable of being opened while so secured is advantageous in that the book need not be removed from the game for playing of the game and thus need never be separated therefrom except for changing game books which could otherwise subject the book to being misplaced or lost.

In a preferred form, the keys for entering input into the game are arranged on the front portion of the housing with the majority of the keys aligned substantially in row laterally across the housing front portion. The alignment of the keys provides the game with a more ergonomic design than conventional keypads which have keys aligned in 3×3 keysets and with a bottom central key which is typically utilized to indicate the number zero. In addition, keys can be provided which have more than one function to allow a user to both enter input relating to the designation of a question, i.e., the question number, and to enter an input relating to the designation of an answer, i.e., the selected letter for the multiple-choice answers corresponding to the question. Thus, a separate set of keys designating letters for the answer choices, and the space associate therewith, is not required further providing the game herein with a compact design.

To enhance the ease in which players can play the game, the game is provided with a NEXT key which allows a user to simply press the NEXT key for advancing to a next question without having to key in the number of the next question or to use the CLEAR and ENTER keys before and after keying in the question number. This is particularly advantageous where the book has hundreds of questions so that where, for example, the question number is in the hundreds, entering each question number requires pressing three keys.

In another form of the invention, an electronic hand-held game played by entering input to the game via keys is provided and includes a body, a front housing portion of the body for containing electronic circuitry of the game and to which the keys are mounted, and a rear extension portion of the body rigidly connected to the front housing portion. The rear extension extends rearwardly from the front housing portion and has peripheral edges including a rear edge distal from the front housing portion. A game book is secured to the rear extension and has sheets with printed matter thereon. The sheets each include a fold line to define a first page and a second page of the sheet for folding the pages closed over pages adjacent the rear extension and for folding the book closed when the game is not being played. The pages are supported on the housing rear extension portion and the fold lines are spaced slightly rearwardly of the rear extension rear edge so as not to interfere with pivoting of the pages opened away from the rear extension about their respective fold lines with the opened pages being positioned beyond the rear extension outside the peripheral edges thereof to allow a user to interactively play the game by reading the matter on the pivoted opened pages and entering input information into the game circuitry by way of the keys based on the particular matter that is read. The arrangement of the game book secured on the rear extension provides the aforementioned advantages of not having to separate the book from the game for playing of the game and providing a compact game body in that the book is pivoted opened while secured to rear extension thereof with the pivoted opened pages extending beyond the rear extension of the game body.

The booklet can include a cover of thicker stock than the sheets and the rear extension can be provided with a slot for receiving a portion of the cover therethrough for retaining the book on the rear extension.

A retainer lip can be provided spaced over the rear extension for retaining free edges of the pages opposite the fold lines captured between the retainer lip and the rear extension.

DETAILED DESCRIPTION OF THE PREFERRED EMBODIMENT

Figure 1:
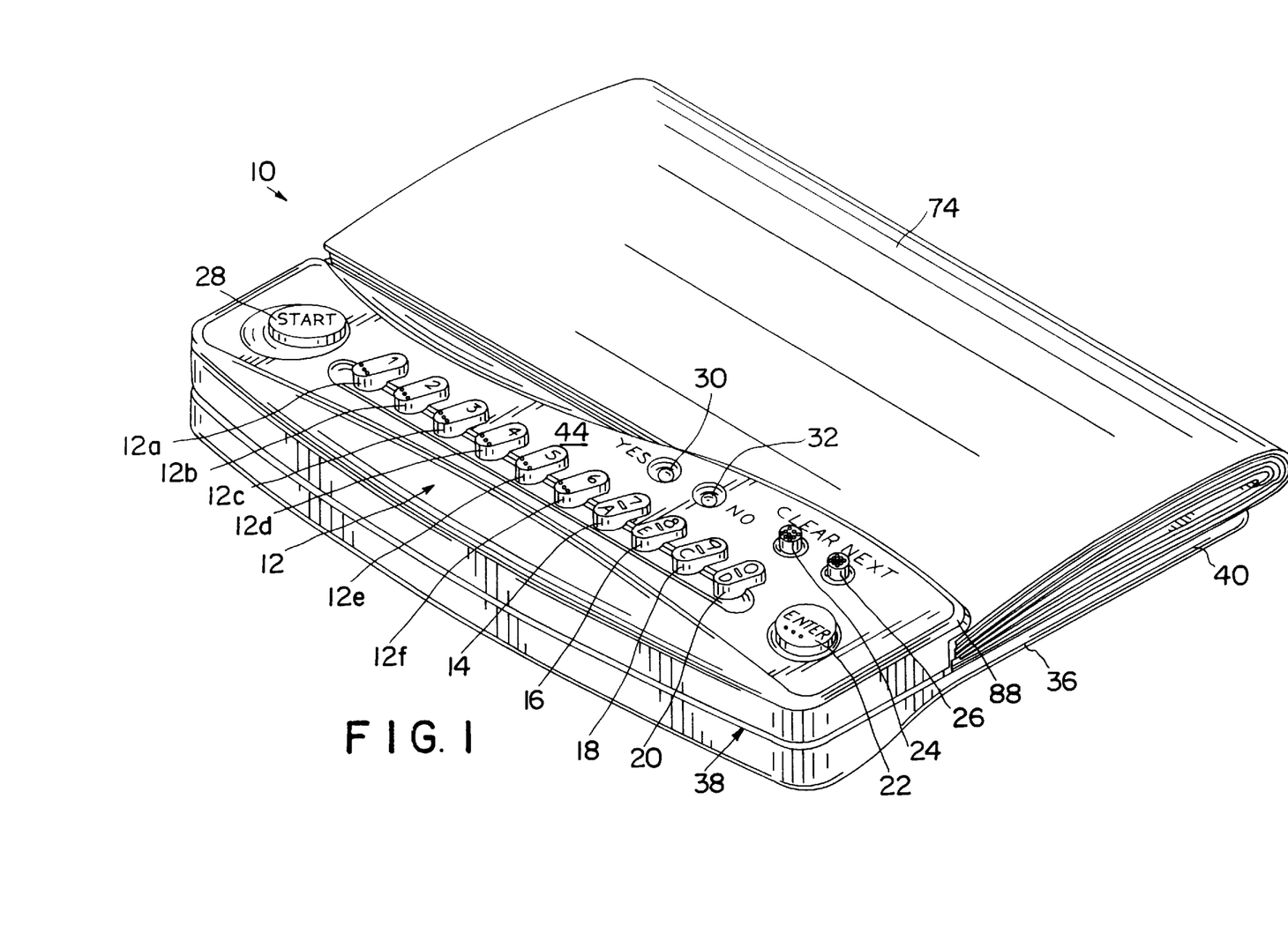
FIG. 1 is a perspective view of the hand-held electronic gaming device according to the present invention.

In FIG. 1, an electronic gaming device 10 in accordance with a preferred embodiment of the present invention is illustrated. The electronic gaming device 10 is played by way of keys 12 in a manner substantially similar to Applicants' predecessor game described earlier although it will be recognized that the gaming device 10 described herein will be adaptable for use with other types of games in addition to the specific multiple-choice type question and answer game discussed herein.

More specifically, the electronic gaming device 10 can be provided with a printed game booklet 34 having questions with corresponding potential answer choices printed thereon with the player attempting to answer the questions by selecting the appropriate answer from the group of answer choices provided for each question. Such question and answer set ups are typically known as multiple-choice questions wherein the answer is selected from a number of potential answers, as described above. To play the game, the START key 28 is depressed, turning on the unit, and a question is selected by keying in the appropriate question number via the numeric keys 12 and/or alpha/numeric keys 14. Once an answer has been chosen, the corresponding letter for the answer can be keyed in by one of the alpha/numeric keys 14 with a display signal being provided to the player indicative of whether the answer selected is correct by way of YES light in the form of an LED 30, or incorrect by way of NO light, in the form of an LED 32. After keying in the question number or answer choice, the ENTER key 22 is depressed with a CLEAR key 24 being provided for choosing a new question or to clear an incorrect question or answer choice. In addition, a NEXT key 26 is provided for selecting the next consecutively numbered question in the book. The NEXT key 26 avoids having to hit the CLEAR key and then re-key in a fresh question number every time a new question is desired. This makes the game easier to play particularly where the player is simply going through the book 34 and answering the questions as they appear consecutively in the book. Thus, in contrast with Applicants' prior game, when the player is simply going through consecutive questions, they need not continually re-key in the question number and can, instead, simply press the NEXT key for the next consecutive question to be answered.

Figure 3:
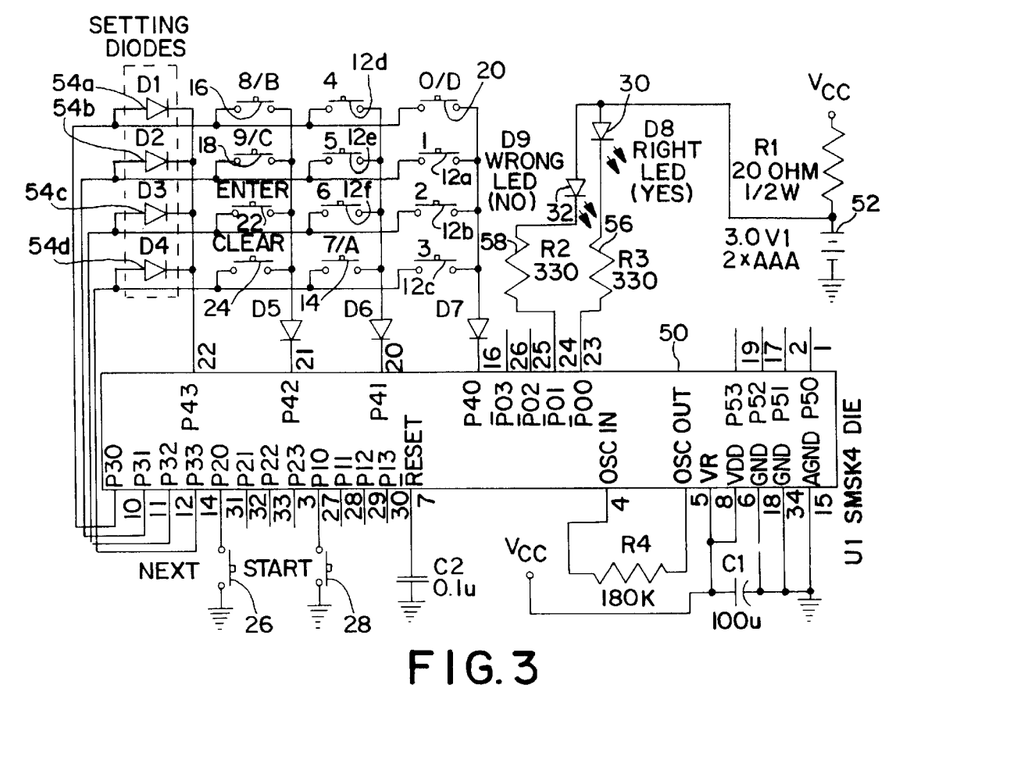
FIG. 3 is a schematic illustration of the electronic circuitry for the electronic gaming device of the present invention.

The following is a description of the electronic circuitry for the electronic gaming device 10 as shown in FIG. 3. As one skilled in the art will appreciate, many other circuitry designs can be utilized to achieve the logic functions of interpreting the input information and providing appropriate output or display signals based on the input provided by the players as described above for the game 10 herein.

The schematic diagram of FIG. 3 shows the microcomputer circuitry for operating the game 10. A microprocessor or microcomputer 50 described herein is the SHARP Co. single chip microcomputer, model SM5K4 which is a single chip, 4 bit microcomputer integrated circuit (IC) die. Of course, any appropriate microcomputer or microprocessor may be employed as microcomputer 50. The microcomputer 50 is powered from a 3 volt source, herein two (2) AAA batteries 52 for providing the $V_{cc}$ potential for the microcomputer IC.

The microcomputer 50 includes a number of inputs and outputs (I/O) ports, registers, and data and program memory for operating the game 10. User input buttons 12a, 12b, 12c, 12d, 12e and 12f for numeric inputs 1–6 respectively; buttons 14, 16, 18 and 20 for alphabetic and numeric inputs 7/A, 8/B, 9/C and 0/D respectively; and buttons 22 and 24 for the ENTER and CLEAR keys respectively are multiplexed as inputs to bits 0, 1, 2, and 3 of port 4. The buttons 12a–f, 14, 16, 18, 20, 22 and 24 are all provided as the keys of a conductive rubber keypad to provide momentary switches for each of the buttons, facilitating momentary level switching at the inputs of the I/O ports of the microcomputer 50. Multiplexing and setting of inputs to port 4 is provided using setting diodes 54a, 54b, 54c and 54d via bits 0, 1, 2 and 3 of port 3, respectively. The NEXT button 26 and START button 28, also momentary switches of the conductive rubber keypad, are interfaced to bit 0 at ports 2 and 1, respectively. LEDs 30 and 32, YES and NO respectively, are powered by battery voltage source 52 with current limited using resistors 56 and 58. LEDs 30 and 32 are turned on and off using output port 0, and particularly bits 0 and 1 are used to drive LED 30 and LED 32, respectively.

The microcomputer 50 is powered on when the START button 28 is depressed, and after a reset of the microcomputer 50, program execution begins wherein the clear button 24 is keyed by the user to initiate operation of the game 10. After pressing the CLEAR button, the user keys in the number of the question by pressing the alpha/numeric buttons. After the game 10 has been idle for three minutes, a timer times out the power supply and turns off the microcomputer 50 or places the microcomputer 50 into its sleep mode.

To advance the game play, the user may key in additional question numbers and attempt corresponding answers, or use the NEXT button 26 to advance to the next question. In this latter NEXT mode of operation, the program flow provides for the NEXT button 26 to increment the number of the question by one (+1) to the next numbered question, which is stored in a register or memory addressed by the microcomputer 50. An address pointer may be used by the program to index the current question. Thus, the storage of data corresponding to the number of the question is either entered manually using the alpha/numeric keypad which may be altered subsequently for later questions, otherwise the question numbers may be advanced to choose the next consecutive question using the NEXT button 26.

Returning to FIGS. 1 and 2, the electronic gaming device 10 includes a body 36 ergonomically designed to be held by the user. The body 36 includes a front housing portion 38 and a rear extension portion 40. The front housing portion 38 has the electronic circuitry for the game 10 contained within its interior 42 and has the keys 12 mounted to project over the top surface 44 of the housing portion 38. The rear extension portion 40 extends rearwardly from the front housing portion 38 to its rear edge 44 distal from the housing portion 38. With the gaming device 10 assembled, the top surface 48 of the rear extension portion extends substantially in the same direction as the top surface 44 of the front housing portion 38 except that it is offset to a level slightly lower than the level of the front housing portion top surface 44. In this manner, when the gaming book 34 is secured to the rear extension portion 40, as more fully described herein, the book 34, when closed, will not project substantially above the front housing portion top surface 44 to keep the game 10 very compact when not in use.

Figure 4:
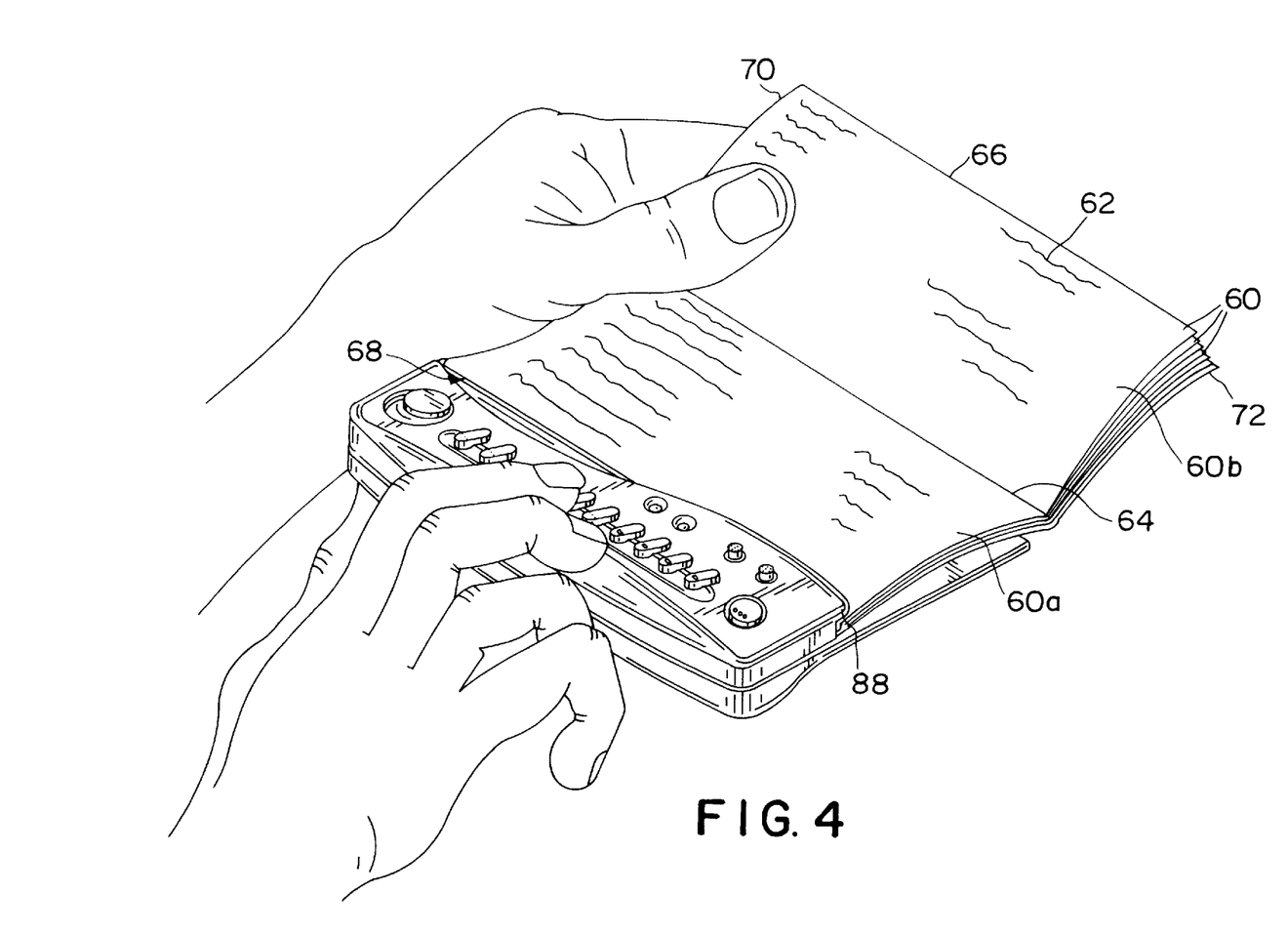
FIG. 4 is a perspective view showing the electronic gaming device being played by a user with the game booklet opened by the user and the user entering input into the game.
Figure 5:
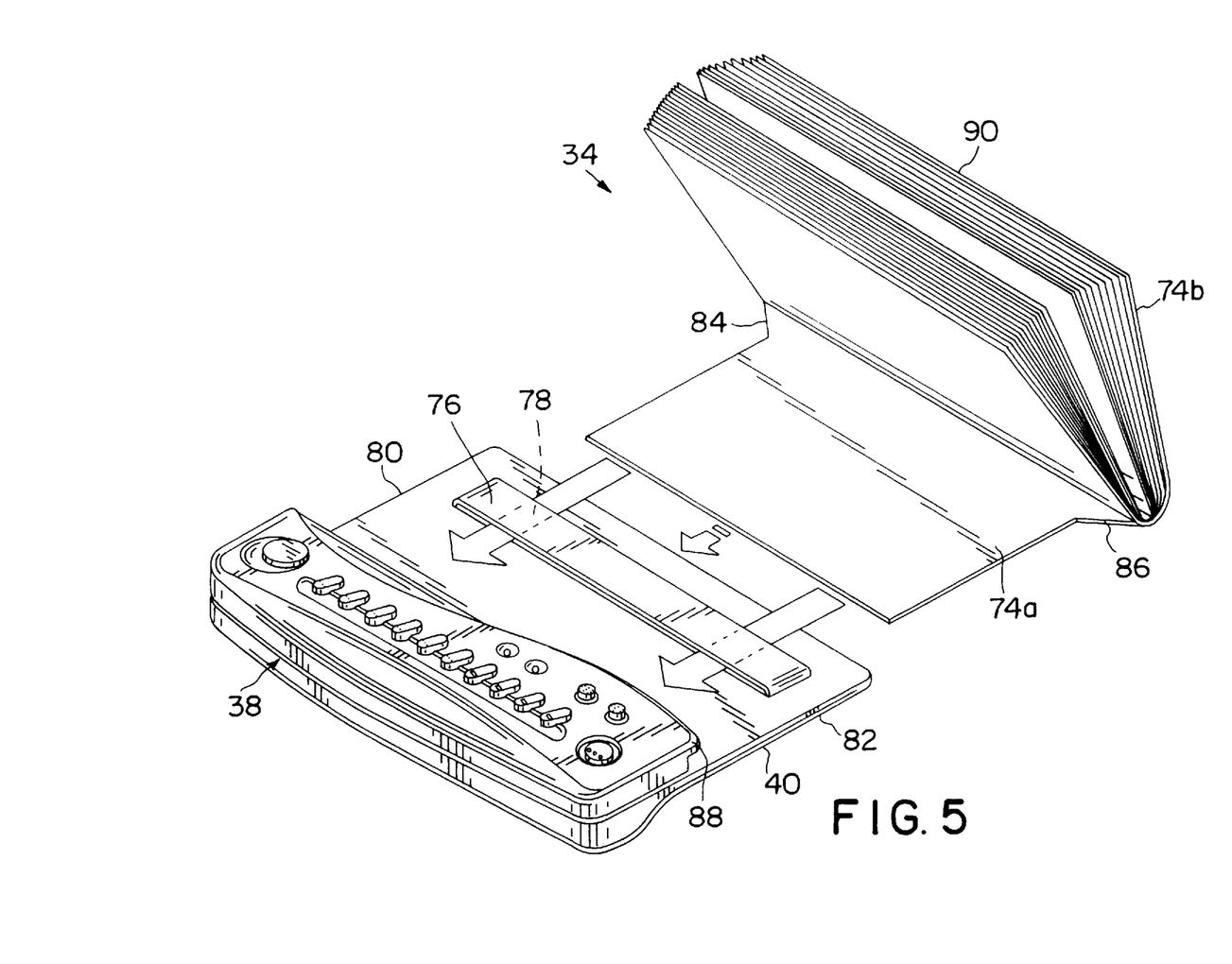
FIG. 5 is a perspective view of the electronic gaming device showing the game booklet removed from the game.

A preferred construction of the game book 34 will next be described while keeping in mind that many other constructions for the book can be utilized with the game 10 described herein. In the preferred and illustrated form, the game book 34 is constructed from a plurality of printed sheets 60 having printed matter 62 in the form of questions and answers printed on their front and back sides. Each sheet 60 can be folded over onto itself by way of fold lines 64 provided halfway between the top and bottom edges 664 and 68 of the sheets and extending between the lateral edges 70 and 72 thereof. The sheets are stapled or otherwise attached together along their fold lines 64 with preferably a cover sheet 74 of thicker stock than the sheets 60 being provided around the outside of the sheets. The fold line 64 provides each sheet 60 with a first page 60a and a second page 60b, as shown in FIG. 4. In FIG. 4, the book 34 is shown open to approximately the middle thereof so that each of the sheets 60 have their first page 60a adjacent the housing extension portion 40 with the second sheet 60b pivoted open about the fold line away from the extension portion 40 to an open position.

To secure the printed game book 34 to the body rear extension portion 40, the rear extension portion 40 is provided with a cover capturing member 76 slightly raised above the rear extension top surface 48 so as to provide a slot 78 below the capturing member 76 for a portion of the cover sheet 74. More specifically, the cover portion 74 similar the sheet 60 is folded about a fold line to form a first cover portion 74a and a second cover portion 74b on either side of the cover fold line. The cover capturing member 76 extends laterally across the extension portion top surface 48, but stops short of the lateral edges 80 and 82 thereof. Thus, to fit the cover sheet 74 which has a lateral dimension similar to that of the printed sheets between their lateral edges 70 and 72 into and through the lateral slot 78, the cover portion 74a can be cut out as at 84 and 86 so as to provide the cover portion 74a with a narrower lateral dimension than the remainder of the cover 74 for sliding against the top surface 48 of the rear extension portion 40 and through the slot 78 under the cover capturing member 76. The cover portion 74a can be slid forwardly to the rear of the front housing portion 48. Thus, by way of the capturing member 76, the game book 34 is removably captured on the rear extension portion 40 with the front housing portion 38 including the playing keys 12 exposed for use by the player. To further secure the book 34 to the game, adhesive can be applied between the cover portion 74a and the rear extension top surface 48 or the adhesive can be used exclusively, although it has been found that the use of the capturing member 76 without the use of adhesive is more than satisfactory for securing the book 34 to the game 10.

Figure 2:
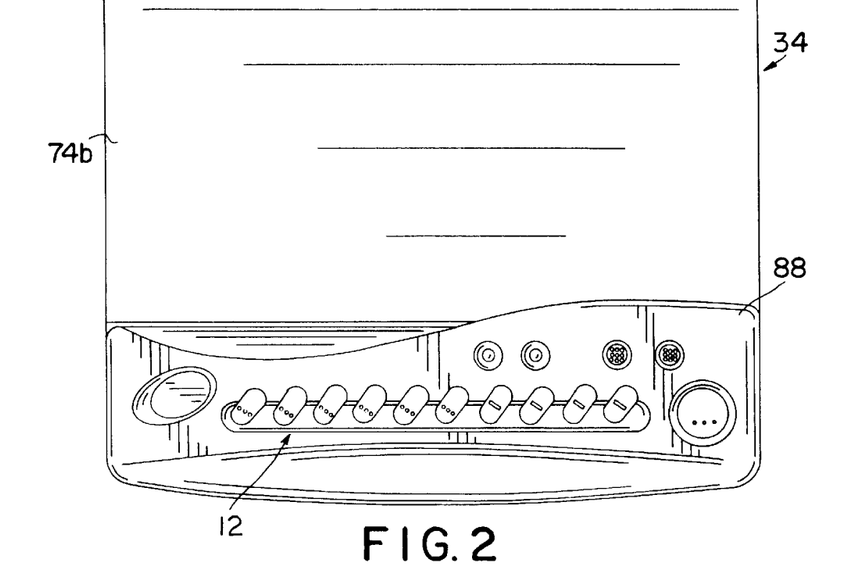
FIG. 2 is a top plan view of the electronic gaming device of FIG. 1 and showing a printed game booklet secured thereto with the book closed and the game not being played.

To keep the book 34 closed when the game 10 is not being played with the cover portion 74b folded over the cover fold line towards the body rear extension 40 and the rear cover portion 74a captured thereon, a retainer lip portion 88 is provided on the front housing portion 38. More specifically, the retainer lip 88 is formed as an extension of the top surface 48 of the front housing portion 38 along one side thereof so that the retainer lip 88 extends and projects over the lower rear extension top surface 48. The distance between the bottom of the retainer lip 88 and the extension top surface 48 is sufficient to allow the folded over sheets 60 and cover 74 to have portions of their free edges opposite their fold lines captured between the lip 88 and top surface 48 with the book 34 closed, as best seen in FIGS. 1 and 2.

Thus, with the booklet 34 closed, it can be seen that the booklet 34 is substantially contained within the predetermined dimensions of the game body 36. As can be seen in the FIGS. 1 and 4, only the rearmost portion of the closed book 34 extends over the rear edge 46 of the rear extension 40; in other words, the fold lines 54 for the sheets 60 and the cover fold line are spaced slightly rearwardly of the extension rear edge 46 with the book 34 secured to the game 10. In this manner, a substantially compact design is afforded by the game 10 having the attached booklet 34 as described herein while avoiding the use of hinged covers and separate game books which could make the game bulky and harder to use, especially in the environment of a moving car where ease of handling and the small design makes the game herein especially attractive for use. By way of example, the game body 36 can have a lateral dimension of less than approximately 5½ inches and a front-to-back dimension of less than approximately 4 inches with the closed booklet 34 extending beyond the rear edge 46 by less than approximately ½ inch with the height or top-to-bottom thickness of the game body 36 being approximately ½ inch at its thickest point at the forwardmost portion of the front housing body 38. This is a substantial reduction in size from Applicants' prior handheld game providing much greater ease in using the game 10 herein.

To play the game 10, the START key 28 is depressed to turn the unit on, as previously described, and the portion of the free edge 90 of the cover portion 74b captured under the retaining lip 78 is slid out from under the retaining lip 88 with the cover portion 74b being pivoted about the cover fold line away from the rear extension 40 and cover portion 74a removably secured thereon. As the fold line for the cover along with the sheet fold lines 64 are spaced rearwardly of the extension rear edge 46, the cover portion 74b and sheets 60 are is easily pivoted away from the extensions 40 without encountering any interference from the extension rear edge 46. Once the cover portion 74b is pivoted open, the back side of the second page 60b of the sheet 60 adjacent the cover 74 is exposed to be read. After flipping through and reading pages having introductory instructions thereon, the player will encounter a page having questions and answers. The player picks a question and enters the number of that question utilizing the appropriately numbered keys 12 and/or alpha/numeric. After reviewing the answer choices, the player picks what they think is the answer to the selected question and enters the letter of their selected answer choice on one of the dual-function alpha/numeric keys 14–20 and thereafter pressing the ENTER key 22 to enter in their choice. After pressing the ENTER key 22, the electronic circuitry will process the input provided to the game by the player and provide a display signal via the appropriate light emitting diode to light up the corresponding YES or NO light 30 or 32 depending on whether the selected answer choice was the correct answer or not. To go to the next higher numbered question in the game book 34, the player simply depresses the next key 26 without having to key in the number of the question and then hitting the ENTER key to enter the number selected.

As shown in FIG. 4, the player can easily manipulate the game 10 herein by holding the game book 34 open to a page having questions thereon with the thumb of their left hand while supporting the body 36 of the game 10 with the remaining fingers of that hand and keying input into the game 10 with their right hand. Thus, there is no need for a support surface on which the game 10 can be placed for playing of the game as its compact size and the ability to support the game with one hand while keeping the book 34 open leaving the remaining hand free to enter input via the keys 12 obviates the need to rest the game on a support surface while holding a separate book open. As can be seen in FIG. 4, the opened book 34 has a dimension between the top edge 66 and bottom edge 68 of the pages 60 which is substantially greater than the corresponding dimension between the front of the front housing portion 38 and the extension rear edge 46 so that the game body 36 is very compact relative to the open book. On the other hand, when the book is folded over, the dimension between the top edge 66 and bottom edge 68 of the pages is reduced in half so as to be substantially contained within the dimensions of the game body 36, thus providing a highly compact game when not in use as only the portions of the cover 74 and pages 60 adjacent their fold lines are spaced beyond the peripheral rear edge 46 of the extension 40 with the lateral edges 70 and 72 of the pages substantially aligned with the corresponding lateral edges 80 and 82 of the extension portion 40 so as not to extend laterally beyond the extension portion edges.

Figure 6:
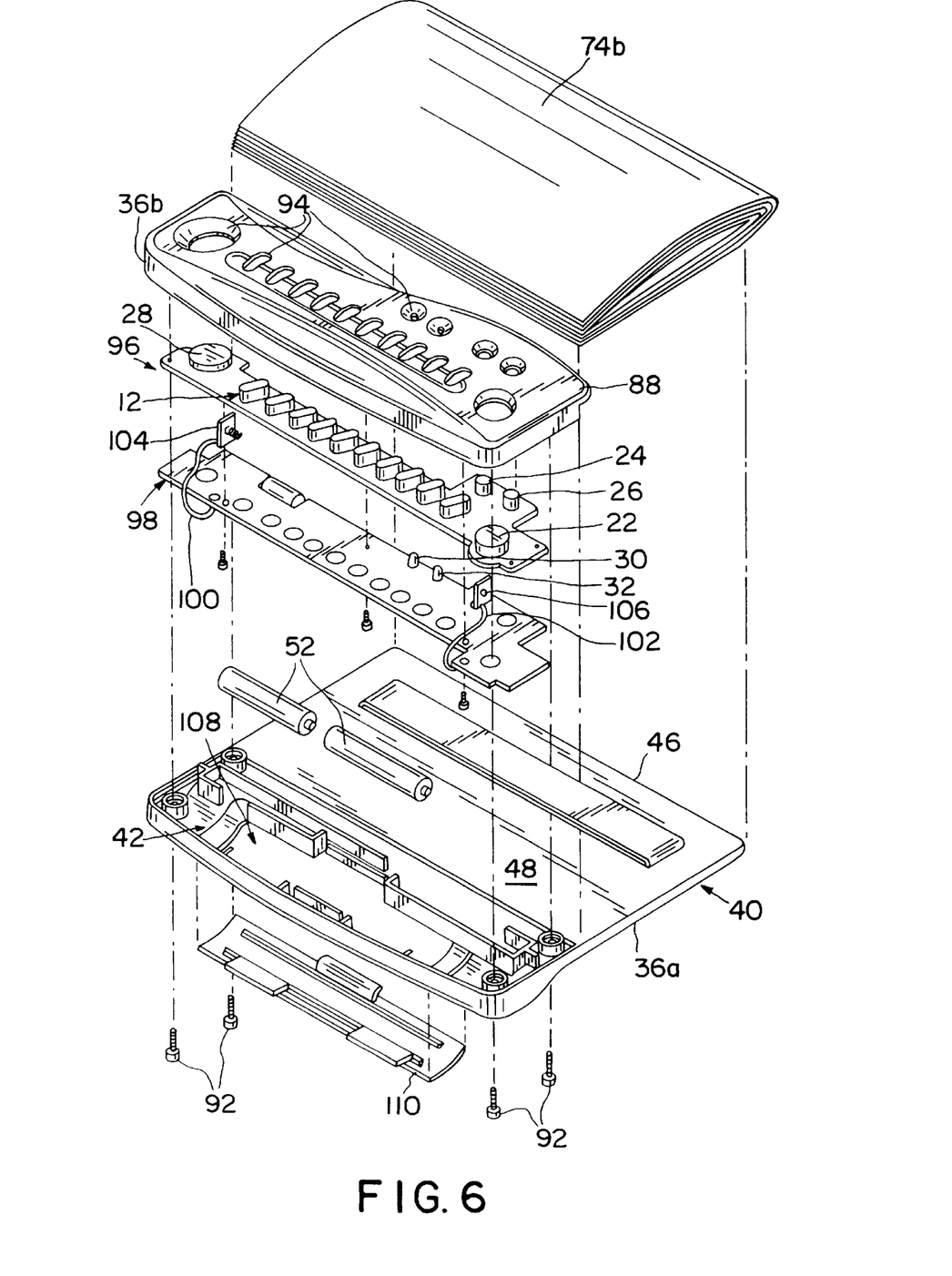
FIG. 6 is a perspective, exploded view of the electronic gaming device of FIG. 1.

Referring to FIG. 6, an unassembled or exploded view of the preferred and illustrated gaming device 10 in accordance with the present invention is illustrated. As shown, the game body 36 can include a lower portion 36a and an upper portion 36b which can be attached together by fasteners 92. The lower portion 36a includes the lower half of the front housing portion 38 integrally formed with the body rear extension 40, whereas the upper body portion 36b consists of the upper half of the front housing portion 38, including the retainer lip 88 thereof. The upper body portion 36b includes a plurality of apertures 94 in which the various keys 12–28 and LEDs 30 and 32 are located. The aforementioned keys 12–28 are mounted on a conductive rubber keypad 96, as previously discussed in describing the circuitry arrangement of schematic FIG. 3. A printed circuit board 98 having the electronic circuitry deposited or etched thereon as is known, and including the microprocessor chip 50 and the LEDs 30 and 32 mounted thereon is provided below the keypad 94 in the interior space 42 of the front housing portion 38. In addition, the PCB can have leads 100 and 102 attached thereto at one end of the leads as by soldering with the leads 100 and 102 connected at their other end to respective electrical contacts 104 and 106 provided in the battery compartment 108 formed at the bottom of the front housing portion interior 42 closed at the bottom by battery compartment door 110 and adapted to receive the two AAA batteries 52 end-to-end therein to power the circuitry of the game.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

We claim:

1. An electronic device comprising:

a housing having predetermined dimensions sized to be supported in a user's hand;

a printed booklet having folded first and second pages joined by a fold line to be folded to a closed position to be supported by the housing and to be substantially contained within the predetermined dimensions of the housing when in the closed position, at least one of said second pages to open into an open position extending substantially outwardly of the housing dimensions while the booklet is unfolded and supported by the housing, said first and second pages including printed matter for prompting a user to select an input in response to the printed matter;

electronic circuitry mounted in the housing for performing logic operations in response to the selected input from the user and for generating a display signal;

input means mounted on the housing and connected to the electronic circuitry for the user to enter the selected input;

a display mounted on the housing for providing a visual stimulus to the user in response to the selected input and the display signal generated by the electronic circuitry, wherein the housing includes a front game play portion having a top surface and a rear booklet support portion having a top surface recessed below the front portion top surface with the rear portion being rigidly connected to the front portion, and the booklet is supported on the rear portion top surface so that the closed booklet is generally level with the front portion top surface and to allow the booklet second pages to be freely opened and pivoted about their respective fold lines so as to extend beyond the housing rear booklet support portion without support from the housing.

2. An electronic device in accordance with claim 1 including means on the housing for removably securing the booklet to the housing to allow the booklet to be removed from the housing.

3. An electronic device in accordance with claim 1 including means on the housing for permanently securing the booklet to the housing against removal therefrom.

4. An electronic device in accordance with claim 1 wherein the housing front game play portion has an interior space for mounting the electronic circuitry, and the input means and the display are mounted on the top surface of the front portion.

5. An electronic device in accordance with claim 4 wherein the input means comprises keys spaced along the top surface of the front portion of the housing to allow the user to readily access the keys while the user holds and operates the device.

6. An electronic device in accordance with claim 5 wherein the front portion top surface has a front edge opposite the rear portion and a majority of the keys are aligned substantially in a row and substantially parallel to the front edge of the housing.

7. An electronic device in accordance with claim 5 wherein the display comprises light emitting diodes.

8. An electronic device in accordance with claim 7 wherein the printed matter on the booklet pages includes questions and corresponding answer choices, and the display is a pair of light emitting diodes with one of the pair of diodes corresponding to a correct answer choice and the other diode corresponding to a wrong answer choice.

9. An electronic device in accordance with claim 5 wherein one of the keys is a next key for advancing to a next question.

10. An electronic device in accordance with claim 4 wherein the device is an electronic learning aid comprising questions and answers.

11. An electronic device in accordance with claim 4 wherein the device is an electronic game.

12. An electronic device in accordance with claim 4 wherein the bottom surface of the front portion of the housing and the bottom surface of the rear portion of the housing are continuous and of unitary construction so that said bottom surfaces of the housing are substantially flat.

13. An electronic device comprising:
  a housing having predetermined dimensions sized to be supported in a user's hand;
  a printed booklet having folded first and second pages joined by a fold line to be folded to a closed position to be supported by the housing and to be substantially contained within the predetermined dimensions of the housing when in the closed position, at least one of said second pages to open into an open position extending substantially outwardly of the housing dimensions while the booklet is unfolded and supported by the housing, said first and second pages including printed matter for prompting a user to select an input in response to the printed matter;
  electronic circuitry mounted in the housing for performing logic operations in response to the selected input from the user and for generating a display signal;
  input means mounted on the housing and connected to the electronic circuitry for the user to enter the selected input;
  a display mounted on the housing for providing a visual stimulus to the user in response to the selected input and the display signal generated by the electronic circuitry,
  wherein the housing comprises a front portion and a rear portion, the front portion having a top surface, a bottom surface, and an interior space for mounting the electronic circuitry, the input means and the display are mounted on the top surface of the front portion, the rear portion having a top surface and a bottom surface, and the printed booklet is mounted on the top surface of the rear portion, and the rear portion has a rear edge opposite the front portion and the fold lines of the pages of the printed booklet are spaced rearwardly of the rear edge to allow the at least one second page to be easily pivoted to its open position about the fold line without interference from the rear edge of the rear portion.

14. An electronic device in accordance with claim 13 wherein a portion of the top surface of the front portion of the housing extends rearwardly over the top surface of the rear portion to form a retainer lip which holds of the second pages of the booklet opposite to their fold line with the second pages folded over their fold line to their closed position.

15. An electronic device comprising:
  a housing having predetermined dimensions sized to be supported in a user's hand;
  a printed booklet having folded first and second pages joined by a fold line to be folded to a closed position to be supported by the housing and to be substantially contained within the predetermined dimensions of the housing when in the closed position, at least one of said second pages to open into an open position extending substantially outwardly of the housing dimensions while the booklet is unfolded and supported by the housing, said first and second pages including printed matter for prompting a user to select an input in response to the printed matter;
  electronic circuitry mounted in the housing for performing logic operations in response to the selected input from the user and for generating a display signal;
  input means mounted on the housing and connected to the electronic circuitry for the user to enter the selected input;
  a display mounted on the housing for providing a visual stimulus to the user in response to the selected input and the display signal generated by the electronic circuitry,
  wherein the housing comprises a front portion and a rear portion, the front portion having a top surface, a bottom surface, and an interior space for mounting the electronic circuitry, the input means and the display are mounted on the top surface of the front portion, the rear portion having a top surface and a bottom surface, and the printed booklet is mounted on the top surface of the rear portion, the input means comprises keys spaced along the top surface of the front portion of the housing to allow the user to readily access the keys while the user holds and operates the device, the front portion top surface has a front edge opposite the rear portion and a majority of the keys are aligned substantially in a row and substantially parallel to the front edge of the housing, and at least one of the keys has two functions with one of the functions being to enter an input relating to the designation of a question and the other function being to enter an input relating to the designation of an answer corresponding to the question.

16. An electronic device comprising:
  a housing having predetermined dimensions sized to be supported in a user's hand;
  a printed booklet having folded first and second pages joined by a fold line to be folded to a closed position to be supported by the housing and to be substantially contained within the predetermined dimensions of the housing when in the closed position; at least one of said second pages to open into an open position extending substantially outwardly of the housing dimensions while the the booklet is unfolded and supported by the housing; said first and second pages including printed matter for prompting a user to select an input in response to the printed matter;

a retainer on the housing for retaining the second pages in their closed, folded position when desired by the user;

means on the housing for securing the booklet to the housing;

electronic circuitry mounted in the housing for performing logic operations in response to the selected input from the user and for generating a display signal;

input means mounted on the housing and connected to the electronic circuitry for the user to enter the selected input;

a display mounted on the housing for providing a visual stimulus to the user in response to the selected input and the display signal generated by the electronic circuitry.

17. The electronic device in accordance with claim 16 wherein the housing includes a rear booklet support portion and a front game play portion rigidly connected to the rear support portion with the rear support portion having peripheral edges, and with the pages in their closed position the booklet is substantially contained within the edges of the support portion.

18. The electronic device in accordance with claim 17 wherein the peripheral edges of the rear support portion include a rear edge, and with the pages in their closed position, the fold lines are positioned beyond the peripheral edges rearwardly of the support portion rear edge to allow the pages to be easily pivoted about the fold lines without interference from the rear edge of the rear portion.

19. The electronic device in accordance with claim 16 wherein the printed booklet is removably secured to the housing to allow the booklet to be removed from the housing.

20. The electronic device in accordance with claim 16 wherein the printed booklet is permanently secured to the housing against removal therefrom.

21. The electronic device in accordance with claim 16 wherein the housing includes a rear booklet support portion and a front game play portion rigidly connected to the rear support portion with the rear and front portions each including a top surface extending in generally the same direction, the rear portion top surface being offset lower than the front portion top surface so that the closed booklet supported on the rear portion top surface does not project substantially beyond the level of the front portion top surface.

22. The electronic device in accordance with claim 21 wherein the front portion top surface includes a lip forming the retainer which extends and projects over the rear portion top surface which retains free edges of the pages opposite the fold line captured between the retainer lip and the rear portion top surface.

23. An electronic game played by entering input to the game via keys, the electronic game comprising:

a body sized to be supported in a user's hand;

a front housing portion of the body for containing electronic circuitry of the game and to which the keys are mounted;

a rear extension portion of the body rigidly connected to the front housing portion and extending rearwardly therefrom and having peripheral edges including a rear edge distal from the front housing portion; and a game book secured to the rear extension and having sheets with printed matter thereon, the sheets each including a fold line to define a first page and a second page of the sheets for folding the pages closed over pages adjacent the rear extension and for folding the book closed when the game is not being played with the pages being supported on the housing rear extension portion, the fold lines being spaced rearwardly of the rear extension rear edge so as not to interfere with pivoting of the pages open away from the rear extension about their respective fold lines with the open pages being positioned beyond the rear extension outside the peripheral edges thereof to allow a user to play the game by reading the matter on the pivoted open pages and entering input information into the game circuitry by way of the keys based on the particular matter that is read.

24. The electronic game of claim 23 wherein the booklet includes a cover of thicker stock than the sheets, and the rear extension has a slot for receiving a portion of the cover therethrough and retaining the book on the rear extension.

25. The electronic game of claim 23 including a retainer lip spaced over the rear extension for retaining free edges of the pages opposite the fold line captured between the retainer lip and the rear extension.

26. The electronic game of claim 23 wherein the pages have lateral edges and the rear extension includes corresponding lateral edges substantially aligned with the lateral edges of the pages adjacent the rear extension.

\* \* \* \* \*